US011805915B2

(12) United States Patent
McKee et al.

(10) Patent No.: US 11,805,915 B2
(45) Date of Patent: *Nov. 7, 2023

(54) SEAT USAGE PREVENTION DEVICE

(71) Applicant: B/E Aerospace, Inc., Winston-Salem, NC (US)

(72) Inventors: Jefferey M. McKee, Duvall, WA (US); Travis K. Finlay, Winston-Salem, NC (US); Glenn A. Johnson, Rural Hall, NC (US); Travis J. Vaninetti, Bothell, WA (US); Charles Martin Hansson, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,054

(22) Filed: Jan. 6, 2023

(65) Prior Publication Data

US 2023/0148757 A1 May 18, 2023

Related U.S. Application Data

(62) Division of application No. 17/317,497, filed on May 11, 2021, now Pat. No. 11,571,070.

(Continued)

(51) Int. Cl.
 A47B 23/00 (2006.01)
 B64D 11/06 (2006.01)
 A47C 7/62 (2006.01)

(52) U.S. Cl.
 CPC ............ *A47C 7/622* (2018.08); *B64D 11/062* (2014.12); *B64D 11/0606* (2014.12); *B64D 11/0627* (2014.12)

(58) Field of Classification Search
 CPC .......... B60N 2/79; B60N 3/002; B60N 2/265; B60N 2/3013; B64D 11/0606; B64D 11/06
 See application file for complete search history.

(56) References Cited

U.S. PATENT DOCUMENTS 3,374,032 A 3/1968 Del
4,118,812 A * 10/1978 Pangburn ............. A47D 15/006
 5/513

(Continued)

FOREIGN PATENT DOCUMENTS

DE 102005045207 A1 3/2007
WO 2014192095 A1 12/2014

OTHER PUBLICATIONS

Extended Search Report in European Application No. 21173942.0 dated Jan. 1, 2022, 12 pages.

(Continued)

*Primary Examiner* — Shin H Kim
(74) *Attorney, Agent, or Firm* — Suiter Swantz pc llo

(57) ABSTRACT

A seat usage prevention device is disclosed. The seat usage prevention deice includes at least one device component being configured to interact with one or more seat components of a first seat. The device component is configured to prevent usage of at least one of a seat pan or seatback of the first seat. The device component further separates a second seat from at least a third seat, wherein the third seat is proximate to at least one of the first seat or the second seat. The seat usage prevention device may include a device component that further includes a cushion, a base, an amenity console, or a vertical separator, or combination thereof.

7 Claims, 10 Drawing Sheets

Related U.S. Application Data

(60) Provisional application No. 63/025,100, filed on May 14, 2020.

(56) References Cited

U.S. PATENT DOCUMENTS

| | | | |
|---|---|---|---|
| 4,938,401 A | | 7/1990 | Weisbrodt et al. |
| 5,123,707 A | * | 6/1992 | Wurzell .................. B60N 2/90 |
| | | | 5/512 |
| 6,644,736 B2 | | 11/2003 | Nguyen et al. |
| 7,628,454 B2 | | 12/2009 | Kato |
| 8,272,674 B2 | | 9/2012 | Vance |
| 8,782,835 B2 | * | 7/2014 | Pozzi .................... B64D 11/06 |
| | | | 244/118.6 |
| 9,049,933 B2 | | 6/2015 | Lavey et al. |
| 9,248,765 B2 | | 2/2016 | Friedlander |
| 9,586,687 B2 | | 3/2017 | Abreu et al. |
| 10,131,317 B1 | | 11/2018 | Harrington |
| 11,370,339 B2 | | 6/2022 | Ketels et al. |
| 11,571,070 B2 | * | 2/2023 | McKee ................ A47C 31/007 |
| 2013/0247303 A1 | | 9/2013 | Pozzi |
| 2016/0250986 A1 | | 9/2016 | Kalis |

OTHER PUBLICATIONS

Partial Search Report for European Application No. 21173942.0 dated Oct. 12, 2021, 14 pages.

* cited by examiner

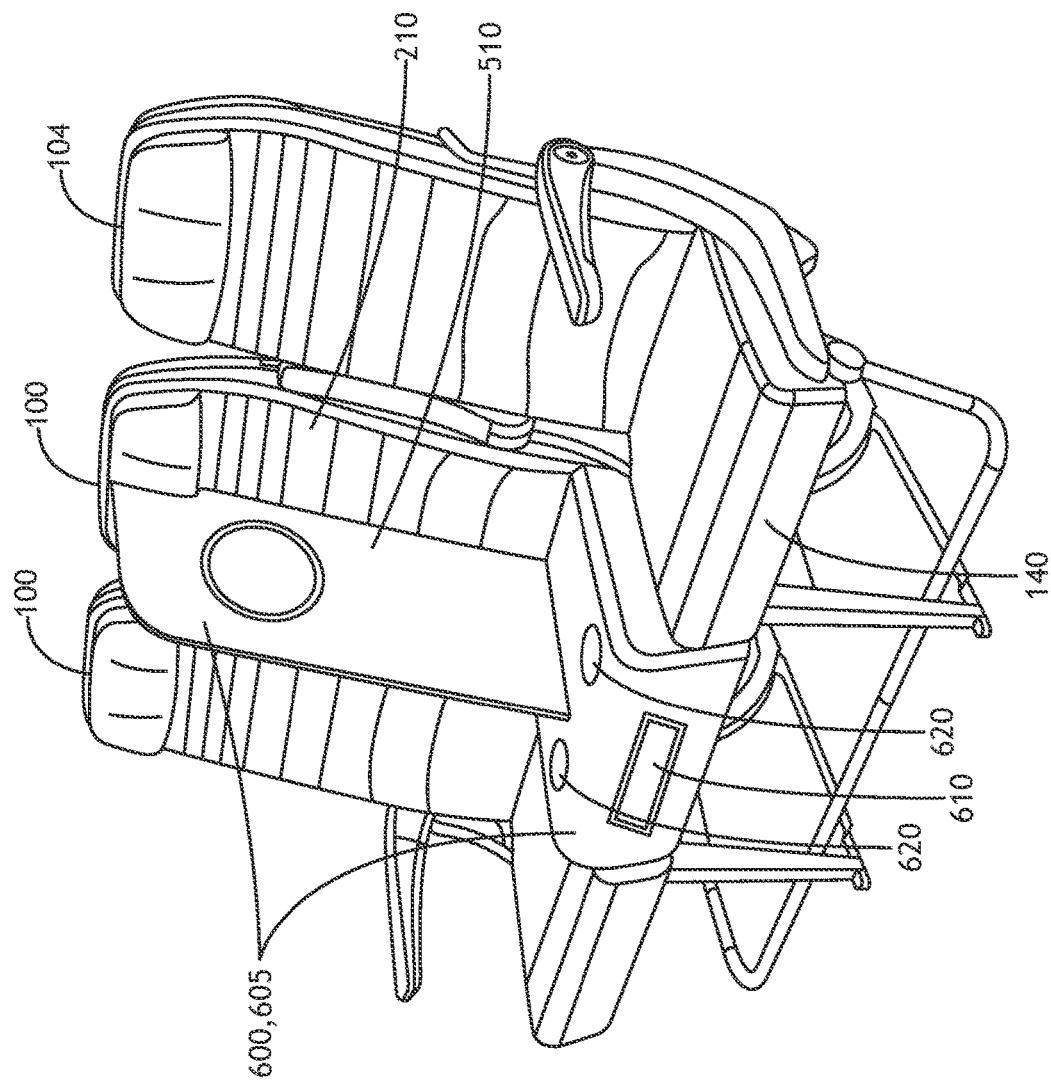

SEAT USAGE PREVENTION DEVICE

CROSS-REFERENCE TO RELATED APPLICATIONS

The present application is a divisional of U.S. patent application Ser. No. 17/317,497, filed May 11, 2021, which is a non-provisional of U.S. Provisional Patent Application No. 63/025,100, filed May 14, 2020, both of which are incorporated herein by reference in their entirety.

BACKGROUND

Social distancing is a method to prevent or reduce transmission of disease by creating space between people who have the disease from people that do not, whether the people with disease realize that they have the disease or not. Social distancing within a vehicle is difficult, as there is a limited area or volume within the vehicle by which to create space between each passenger. Both passengers and commercial transportation companies desire some form of physical barrier that creates separation between individual travelers during epidemics, particularly epidemics of airborne diseases.

Reduced seating arrangements within a vehicle is one method to increase social distancing within a vehicle. For example, removal of seats within a vehicle may create extra space between passengers, however, removal of seats is labor intensive, and storage of removed seats may be cost prohibitive. In another example, posting of signs or warnings on seats that the seats are not to be used may increase social distancing, however, passengers may still decide to sit upon the seat regardless of the sign or warning. Therefore, it is desirable to provide a system or method that avoids the shortcomings of conventional approaches.

SUMMARY

A seat usage prevention device is disclosed. In one or more embodiments, the seat usage prevention device includes at least one device component being configured to interact with one or more seat components of a first seat. In one or more components, the at least one device component configured to prevent usage of at least one of a seat pan or a seatback of the first seat. In one or more embodiments, the at least one device component is further configured to separate a second seat from at least a third seat. In one or more embodiments, the at least the third seat is proximate to at least one of the first seat or the second seat.

In some embodiments of the seat usage prevention device, the seat usage prevention device the first seat further includes a seat belt.

In some embodiments of the seat usage prevention device, the at least one device component further includes a cushion and a surrounding enclosure. In some embodiments of the seat usage prevention device, the surrounding enclosure is configured to couple to the seat belt via at least one coupling point.

In some embodiments of the seat usage prevention device, the at least one device component further includes an amenity console configured to rest on a seat pan cushion of the first seat. In some embodiments of the seat usage prevention device, the amenity console is configured to couple to the seat belt of the first seat.

In some embodiments of the seat usage prevention device, the at least one device component further includes an amenity console configured to rest on a seatback cushion of the first seat. In some embodiments of the seat usage prevention device, the amenity console is further configured to couple to the seat belt of the first seat.

In some embodiments of the seat usage prevention device of the first seat further includes a headrest.

In some embodiments of the seat usage prevention device, of the at least one device component further includes a first portion configured to extend outward from the seatback and a second portion configured to couple to the headrest.

In some embodiments of the seat usage prevention device, the at least one device component further includes a cushion and a surrounding enclosure. In some embodiments of the seat usage prevention device, the surrounding enclosure is configured to couple to the headrest via at least one coupling point.

In some embodiments of the seat usage prevention device, the at least one device component further includes a base and a vertical separator. In some embodiments of the seat usage prevention device, the base is configured to rest on a seat pan cushion of the first seat.

In some embodiments of the seat usage prevention device, the at least one device component further includes a base and a vertical separator. In some embodiments of the seat usage prevention device, the base is configured to couple to a seat pan cushion of the first seat.

In some embodiments of the seat usage prevention device, the at least one device component further includes a base and a vertical separator. In some embodiments of the seat usage prevention device, the base is configured to couple to a seat base of the first seat.

In some embodiments of the seat usage prevention device, the at least one device component further includes a body with an upward facing surface and at least one support structure coupled to the body. In some embodiments of the seat usage prevention device, the at least one support structure is configured to couple to a seat base of the first seat.

In some embodiments of the seat usage prevention device, the at least one device component includes a body with an upward facing surface and at least one support structure coupled to the body. In some embodiments of the seat usage prevention device, the at least one support structure is configured to rest on a seat pan cushion of the first seat.

In some embodiments of the seat usage prevention device, the at least one device component includes a body with an upward facing surface and at least one support structure coupled to the body, the at least one support structure configured to rest on a seat pan cushion of the first seat.

In some embodiments of the seat usage prevention device, the seat usage prevention device further includes a hinge coupled to the body and one of the at least one of the at least one support structures. In some embodiments of the seat usage prevention device, the body is configured to fold up against the one or the at least one support structure via the hinge.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 6 is a diagram illustrating three passenger seats with a seat usage prevention device, in accordance with one or more embodiments of this disclosure;

DETAILED DESCRIPTION

Figure 1:
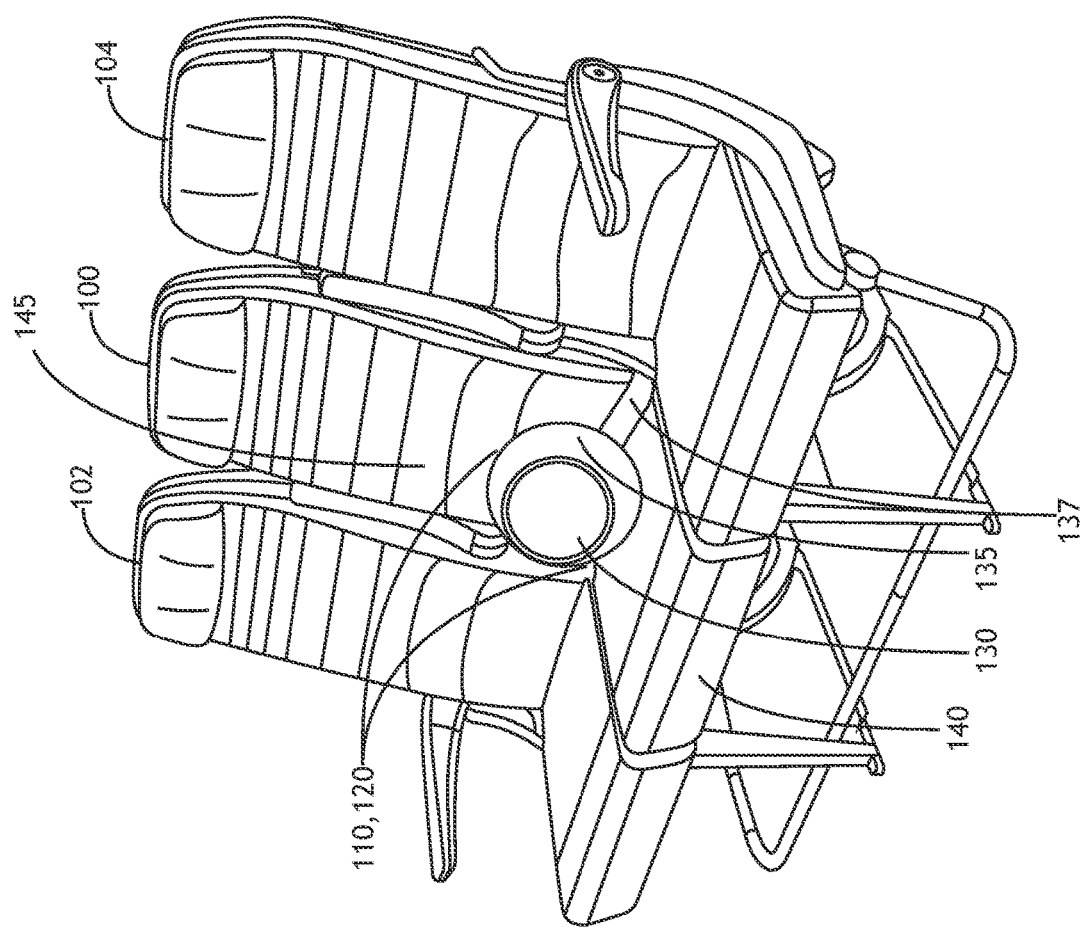
FIG. 1 is a diagram illustrating three passenger seats with a seat usage prevention device, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

A seat usage prevention device is disclosed. The seat usage prevention device attaches or is disposed upon a passenger seat, and prevents a passenger from comfortably sitting on the passenger seat (e.g., sitting on the seat pan, or laying against the seatback). The seat usage prevention device may be used on any seat designated as a non-sitting seat, resulting in separation and/or increased space between passengers. For example, the middle seat in a row of three aircraft seats may be designated as a seat that is not to be sat upon by a passenger. Along with designating a seat in such manner, a seat usage prevention device may be used to further designate that the seat is not to be sat upon, and to potentially block a passenger from sitting on the seat. Furthermore, the seat usage prevention device may be used as a block to shield passengers sitting within the same row of seats from each other (e.g., to inhibit communication of viral particles from a cough).

Referring generally to FIGS. 1-8B, in embodiments, the seat prevention device includes at least one device component being configured to interact with one or more seat components of a first seat. For purposes of the present disclosure, the term "interact" refers to coupling, resting, or the like with respect to the one or more components of the first seat. In embodiments, the seat usage prevention device is configured to prevent usage of at least one of a seat pan or a seatback of the first seat. In some embodiments, the at least one device component is configured to separate a second seat from at least a third seat, the at least the third seat being proximate to at least one of the first seat or the second seat. For instance, at least one of the first seat may be proximate to a third seat across an aisle. By way of another instance, at least one of the first seat may be proximate to a third seat within a row of seats. By way of another instance, at least one of the first seat may be proximate to a third seat diagonal from the first seat.

FIG. 1 illustrates a row of three passenger seats with the middle passenger seat (e.g., a first seat 100) configured with a seat usage prevention device 110 that includes a device component 120, in accordance with one or more embodiments of the present disclosure. The first seat 100 may be configured as flanked on one side by a second seat 102 and flanked on another side by a third seat 104 (e.g., the first seat 100, is configured between the second seat 102 and the third seat). The seat usage prevention device 110 prevents a passenger from sitting on the first seat 100 (e.g., sitting on a seat pan 140 or seatback 145 of the first seat), augmenting social distancing between passengers.

In some embodiments, the device component 120 is configured to interact with a first seat 100. For example, the at least one device component may interact with a seat pan 140 and/or seatback 145 of the first seat 100. The seat pan 140 may include a seat pan cushion. In some embodiment, the at least one device component 120 includes a cushion 130 and a surrounding enclosure 135. The surrounding enclosure 135 may be configured to couple to a portion of the first seat 100. For example, the surrounding enclosure 135 may be configured to couple to a seat belt 137 of the first seat 100 via at least one coupling point (e.g., one or more loops, hooks, or the like). The cushion 130 may be any type of cushion 130 known in the art including, but not limited to, a plush cushion (e.g., a pillow), or the like). The surrounding enclosure 135 may be formed of any material known in the art including, but not limited to, plastic, foam, or the like.

The device component 130 may be configured as the entirety of the seat usage prevention device 110 or a component of the seat usage prevention device 110. The device component 120 may be configured to interact directly with one or more seat components (e.g., the seat pan 140, seatback 145), or may interact indirectly with one or more seat components. For example, the cushion 120 may be coupled to a coupling that is itself coupled to the seat belt 137.

Figure 2:
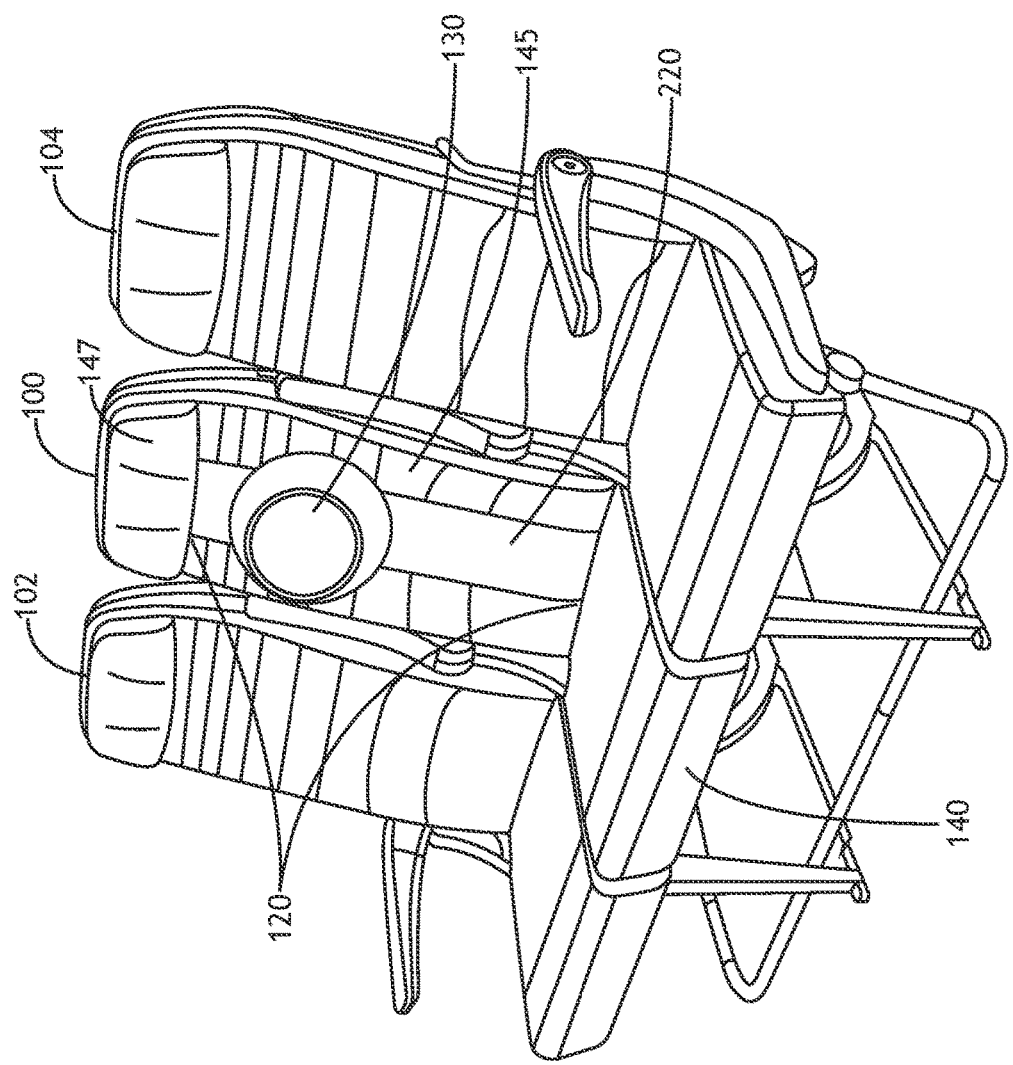
FIG. 2 is a diagram illustrating three passenger seats with a seat usage prevention device, in accordance with one or more embodiments of this disclosure.

FIG. 2 illustrates a row of three passenger seats with the first seat 100 configured with the seat usage prevention device component 120, in accordance with one or more embodiments of the present disclosure. In some embodiments, the surrounding enclosure 135 may be configured to couple to the seatback 145 or a headrest 147 headrest of the first seat 100 via a coupling point (e.g., one or more hooks, loops, or the like). For instance, a sash 220 may be configured to couple the cushion 130 to the headrest 147 and/or seatback 145 of the first seat 100. In particular, the sash may be coupled (e.g., sewn, or attached via a hook-and-loop mechanism) to both the top and bottom and bottom of the seatback 145, wherein the device component 120 is then attached directly or slidably attached to the sash 220. The sash 220 may be any type of sash 220 or sash-like object known in the art.

Figure 3:
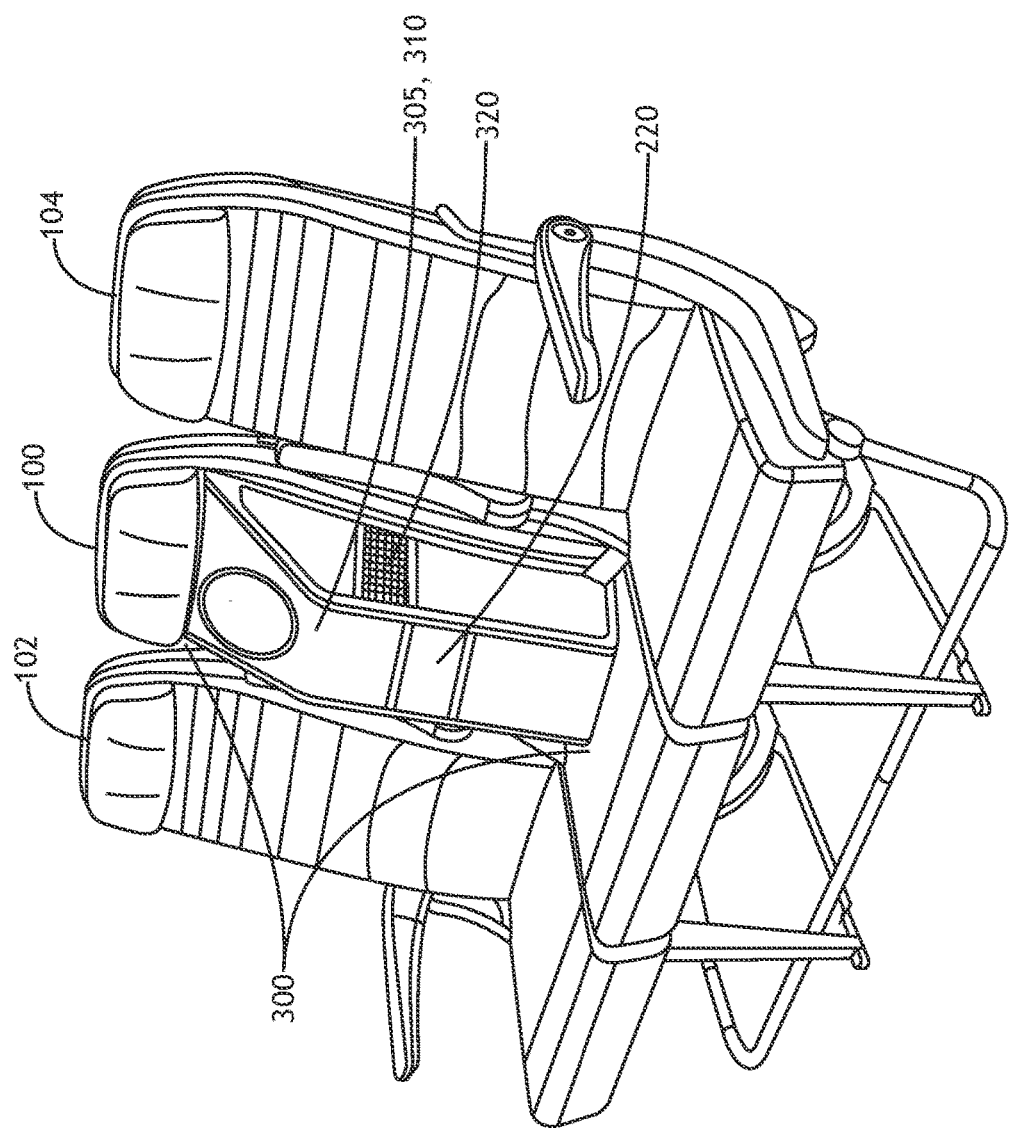
FIG. 3 is a diagram illustrating three passenger seats with a seat usage prevention device, in accordance with one or more embodiments of this disclosure.

FIG. 3 is a diagram illustrating a first seat configured with a seat usage prevention device 300, in accordance with one or more embodiments of this disclosure. In some embodiment, the seat usage prevention device 300 includes at least one device component 305 configured as an amenity console 310. The amenity console 310 is configured to rest upon the seat pan 140 and/or seatback 145. For example, the amenity console 310 may be configured to couple to the first seat 100 via a seat belt 137. In some embodiments, the amenity console 310 may further be coupled to the headrest 147 of the first seat 100. In some embodiments, the amenity console 310 contains one or more storage pockets 320. For example, in some embodiments, one or more storage pockets 320 may be used for trash. In some embodiments, the amenity console 310 may be collapsible. For example, the amenity console may be configured to fold flat for storage.

Figure 4:
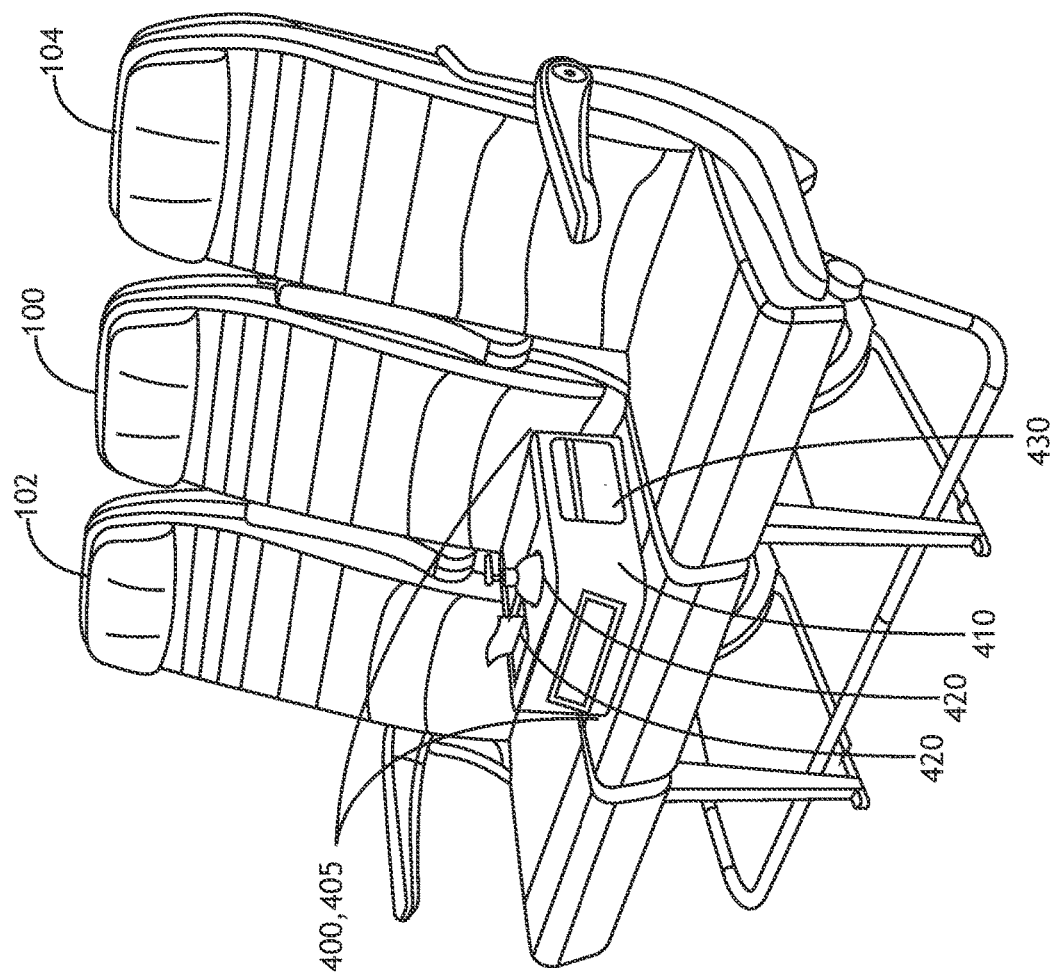
FIG. 4 is a diagram illustrating three passenger seats with a seat usage prevention device, in accordance with one or more embodiments of this disclosure.

FIG. 4 is a diagram illustrating a first seat 100 with a seat usage prevention device 400, in accordance with one or more embodiments of this disclosure. In some embodiments, the seat usage prevention device includes at least one device component 405. The at least one device component 405 may include an amenity console 410. In some embodiment, the amenity console is configured to rest on a seat pan cushion of the first seat. In some embodiments, the amenity console 410 is configured to couple to a seat belt 137 of the first seat 100. In some embodiments, the amenity console 410 includes one or more compartments 420 for one or more amenities (e.g., disinfectant wipes and/or hand sanitizer). For example, the amenity console 410 may include one or more pockets 430. For instance, the one or more pockets 430 may be used to hold trash. By way of another example, the amenity console 410 may include one or more receptacles specific for holding hand. In another example, the amenity console 410 includes one or more tissue holders and/or wipe holders.

Figure 5:
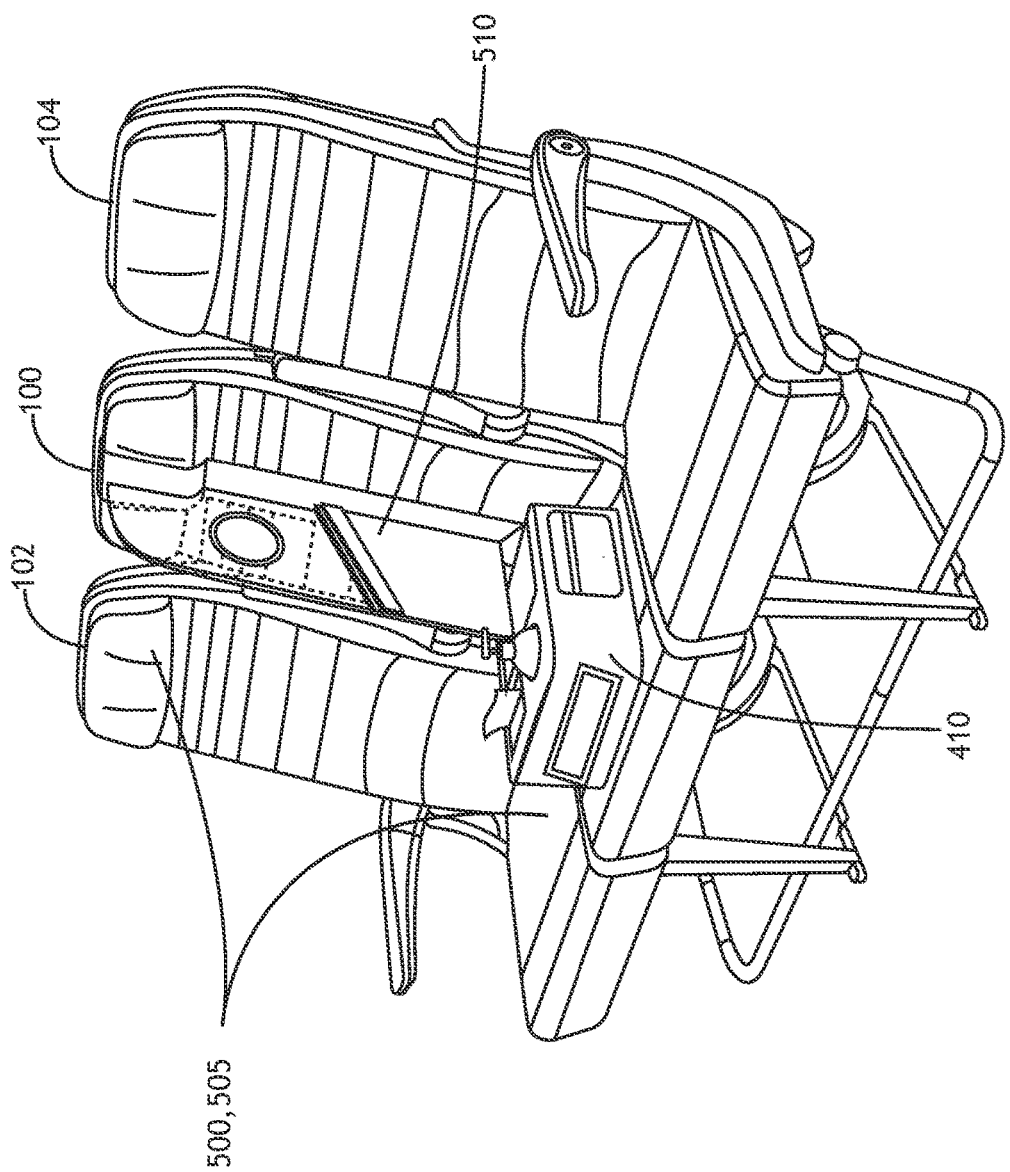
FIG. 5 is a diagram illustrating three passenger seats with a seat usage prevention device, in accordance with one or more embodiments of this disclosure.

FIG. 5 is a diagram illustrating one or more seats 100 with a seat usage prevention device 500, in accordance with one or more embodiments of this disclosure. In some embodiment, the seat usage prevention device 500 includes at least one device component 505. For example, the at least one device component 505 may include the amenity console 410 and a vertical separator 510 configured to block airflow from passengers sitting on either side of the first seat 100. In some embodiments, the amenity console 410 is configured to rest on the seat pan 140 of the first seat. In some embodiment, the amenity console 410 is configured to couple to the first seat via a seat belt 137 of the first seat 100. The vertical separator 510 may be configured as any height. For example, the vertical separator 510 may reach from the amenity console 410 to approximately halfway up the seatback 145. In another example, the vertical separator 510 may reach to the top of the seatback 145. Therefore, the above description should not be interpreted as a limitation of the present disclosure, but merely an illustration.

FIG. 6 is a diagram illustrating one or more seats 100 with a seat usage prevention device 600, in accordance with one or more embodiments of this disclosure. In some embodiment, the device 600 includes at least one device component 605. In some embodiments, the at least one device component 605 includes a vertical separator 510 and a base 610. In some embodiments, the base 610 and the vertical separator 510 are coupled. In some embodiments, the base 610 is configured to rest upon the seat pan 140 and/or couple to the seat belt 137. In some embodiment, the base 610 is configured to couple to a portion of a seat pan cushion of the seat pan 140. The base 610 may couple to the seat pan cushion of the seat pan 140 and/or the seatback 145 via any fastening mechanism known in the art. The vertical separator 510 may be coupled to the seatback 145 via any fastening mechanism known in the art.

In some embodiments, the base 610 is coupled to the frame of the seat pan 140 (e.g., the seat usage prevention device 600 and/or the base 610 replaces one or more seat cushions). The seat usage prevention device 600 may be secured to the passenger seat by any means known in the art including but not limited to a seat belt (e.g., via at least one coupling point). In some embodiments, the base is configured with cup-holders 620. The cup-holders 620 may be configured to hold any type of beverage or personal item including but not limited to an aluminum can, a water bottle, a mobile device, or a bottle of sanitizer.

Figure 7A:
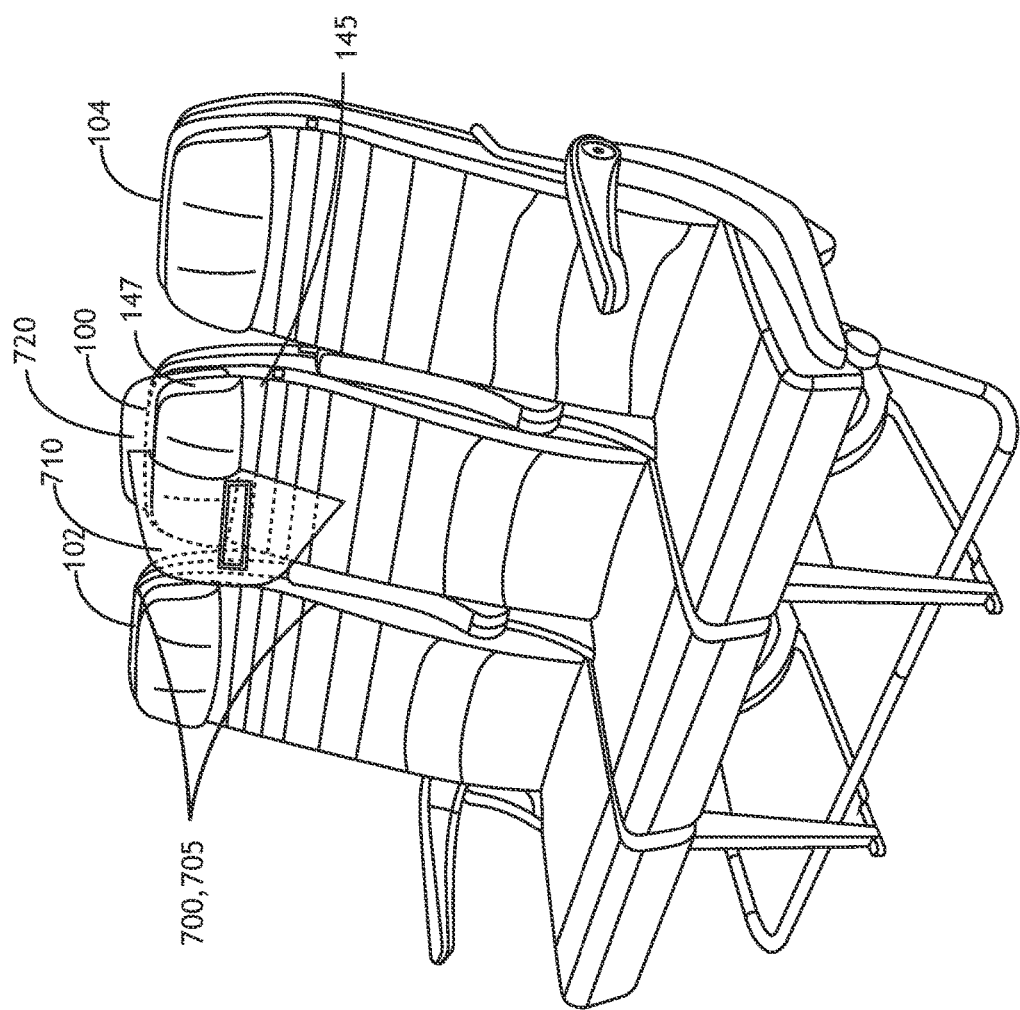
FIG. 7A is a diagram illustrating three passenger seats with a seat usage prevention device, in accordance with one or more embodiments of this disclosure.
Figure 7B:
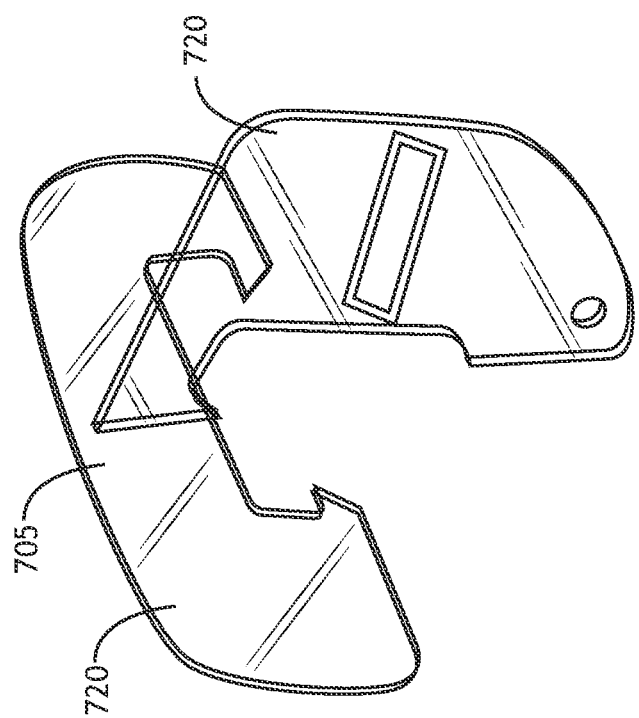
FIG. 7B is a diagram of a seat usage prevention device, in accordance with one or more embodiments of this disclosure.

FIG. 7A is a diagram illustrating one or more seats 100 with a seat usage prevention device 700, in accordance with one or more embodiments of the present disclosure. In some embodiments, the seat prevention device 700 includes a device component 705. The device component 705 includes a first portion 710 configured to extend outward from the seatback 145 and a second portion 720 configured to couple to the headrest 147 of the first seat. For example, the device component 705 may clamp onto a top portion of the passenger seat (e.g., the headrest 147) via an interference fit. In another example, the device component 705 attaches to the seatback 145 and/or headrest 147 of the passenger seat 100 (e.g., the device component 705 clamps on to a contour of the headrest 330 or other component of the passenger seat 100). In some embodiments, the device component 705 may be added on to other interfaces (e.g., the device component 705 may be added to other seat usage prevention devices 300,400,500,600). The device component 705 may be uncoupled from the passenger seat 100, as shown in FIG. 7B.

Figure 8A:
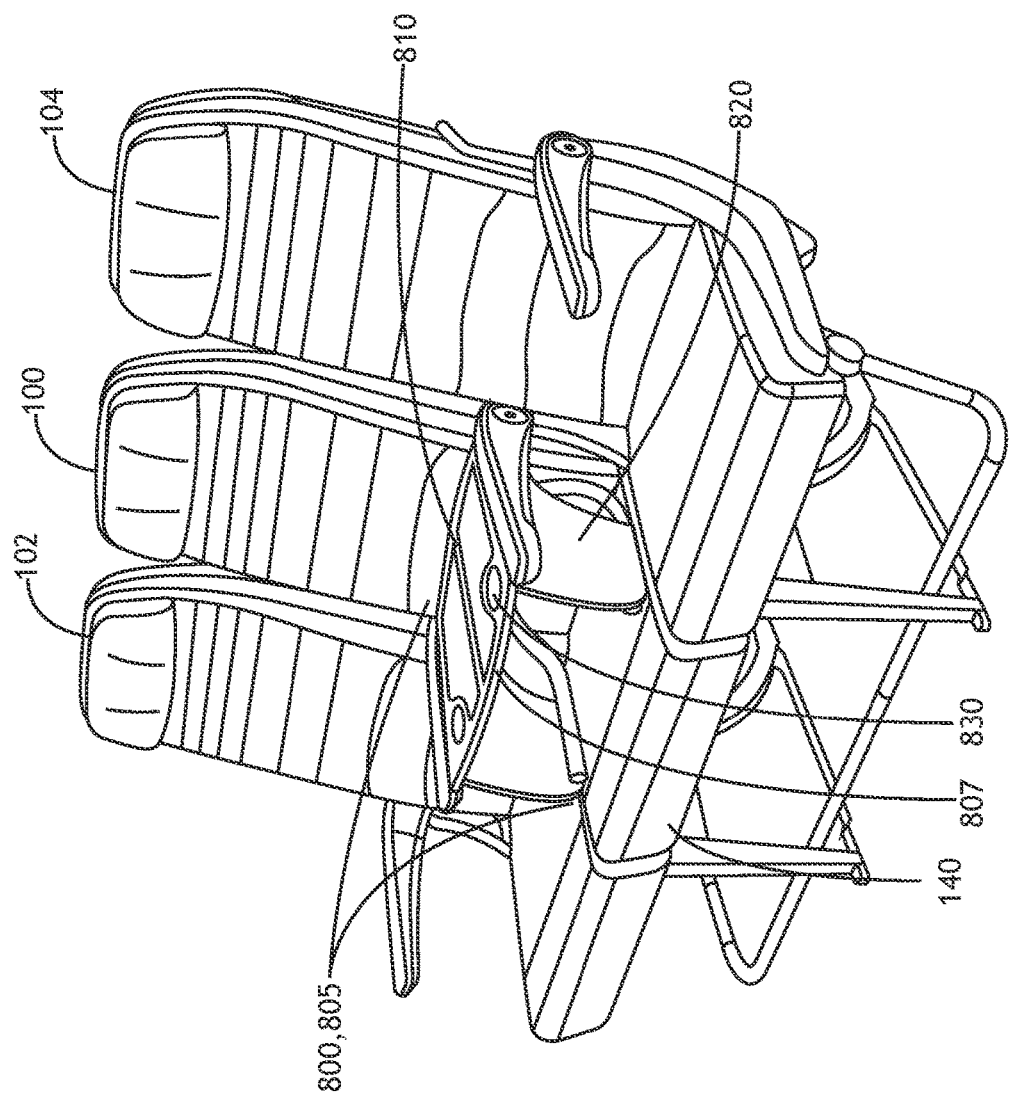
FIG. 8A is a diagram illustrating three passenger seats with a seat usage prevention device, in accordance with one or more embodiments of this disclosure.
Figure 8B:
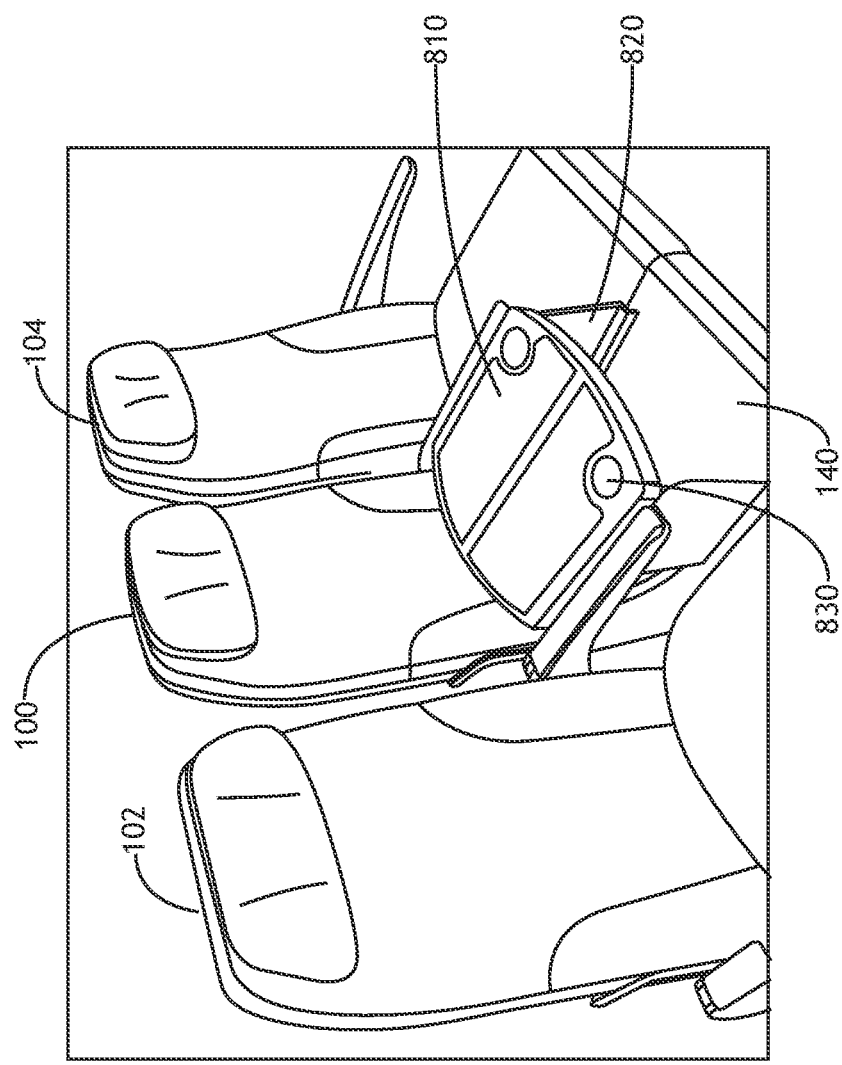
FIG. 8B is a diagram illustrating three passenger seats with a seat usage prevention device, in accordance with one or more embodiments of this disclosure.

FIG. 8A-8B is a diagram illustrating one or more seats with a seat usage prevention device 800 that includes at least one device component 805, in accordance with one or more embodiments of this disclosure. In some embodiments, the device component 805 includes a body 807 (e.g., table) that further includes an upward facing surface 810 and at least one support structure 820 coupled to the body 807. In some embodiments, the at least one support structure 820 is configured to couple to the seat pan 140 and/or seat pan cushion of the first seat 100. In some embodiment, the at least one support structure 820 is configured to rest on the seat pan 140 of the first seat 100. In some embodiments, the at least one support structure 820 is configured to couple to a seat base and/or frame of the first seat. The upward facing surface 810 may including any surface known in the art including, but not limited to, a tray table, a table surface, or the like. The seat usage prevention device 800 may be secured to the passenger seat 100 by any means known in the art including but not limited to a seat belt 137 or clamps. In some embodiments, the upward facing surface may be configured to have cupholder 830 and/or other devices to hold one or more objects (e.g., one or more compartments, tissue holders, electronic holders, or the like). The seat usage prevention device 800 may be configured to collapse into a smaller dimension when not in use and/or put into storage. For example, the body 807 and one or more of the support structures 820 may be coupled via a hinge configured to allow the seat usage prevention device to fold the one or more support structures up against the body 807.

It is noted that any of the seat usage prevention devices 120, 300, 400, 500, 600, 700, 800 may be placed on any passenger seat 100 with a row of passenger seats. For example, the seat usage prevention devices 120, 300, 400, 500, 600, 700, 800 may be coupled to an aisle passenger seat 100. Therefore, the above description should not be interpreted as a limitation of the present disclosure, but merely an illustration.

It is noted that any seat usage prevention device 110, 300, 400, 500, 600, 700, 800 may be configured to include the entirety of, or one or more components of, any other seat usage prevention devices 110, 300, 400, 500, 600, 700, 800 and vice-versa. Similarly, it is noted that any device component 120, 305, 405, 505, 605, 705, 805 may be configured to include the entirety or, or one or more components of, any other device component 120, 305, 405, 505, 605, 705, 805.

Therefore, the above description should not be interpreted as a limitation of the present disclosure, but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A seat usage prevention device, the seat usage prevention device comprising:
at least one device component being configured to interact with one or more seat components of a first seat, the at least one device component including a body with an upward facing surface and at least one support structure coupled to the body, the upward facing surface including a planar table surface,
the at least one device component configured to prevent usage of at least one of a seat pan or a seatback of the first seat,
the at least one device component configured to separate a second seat from at least a third seat, the at least the third seat being proximate to at least one of the first seat or the second seat, a top surface of the planar table surface being substantially flush with a top surface of a first armrest positioned between the first seat and the second seat and a top surface of a second armrest positioned between the first seat and the third seat.

2. The seat usage prevention device of claim 1, wherein the first seat includes a seat belt.

3. The seat usage prevention device of claim 1, wherein the first seat includes a headrest.

4. The seat usage prevention device of claim 1, wherein the at least one support structure is configured to couple to a seat base of the first seat.

5. The seat usage prevention device of claim 1, wherein the at least one support structure is configured to rest on a seat pan cushion of the first seat.

6. The seat prevention device of claim 1, further comprising:
a hinge coupled to the body and one of the at least one support structures, wherein the body is configured to fold against the one of the at least one support structure via the hinge.

7. The seat usage prevention device of claim 1, wherein the upward facing surface includes a cupholder.

\* \* \* \* \*